United States Patent
Kodeswaran et al.

(10) Patent No.: US 9,807,060 B2
(45) Date of Patent: Oct. 31, 2017

(54) GOVERNED ROUTING OF ENTERPRISE DATA IN HYBRID MOBILE APPLICATIONS

(71) Applicant: International Business Machines Corporation, Armonk, NY (US)

(72) Inventors: Palanivel A. Kodeswaran, Bangalore (IN); Prasad G. Naldurg, Bangalore (IN); Venkatraman Ramakrishna, New Delhi (IN); Arvind Seshadri, Bangalore (IN); Michael Steiner, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 14/657,539

(22) Filed: Mar. 13, 2015

(65) Prior Publication Data

US 2016/0267286 A1  Sep. 15, 2016

(51) Int. Cl.
G06F 21/00 (2013.01)
H04L 29/06 (2006.01)
G06F 21/62 (2013.01)

(52) U.S. Cl.
CPC .......... H04L 63/04 (2013.01); G06F 21/6263 (2013.01)

(58) Field of Classification Search
None
See application file for complete search history.

(56) References Cited

U.S. PATENT DOCUMENTS

| | | | | |
|---|---|---|---|---|
| 7,793,100 B2 * | 9/2010 | Arroyo | ............... | G06F 21/6218 713/167 |
| 7,814,531 B2 * | 10/2010 | Khosravi | ............ | H04L 61/2015 709/220 |
| 8,060,868 B2 * | 11/2011 | Meijer | ...................... | G06F 8/72 717/114 |
| 8,572,727 B2 * | 10/2013 | Centonze | ................ | G06F 21/57 713/155 |
| 8,745,755 B2 | 6/2014 | Borzycki et al. | | |
| 8,869,235 B2 | 10/2014 | Qureshi et al. | | |
| 2006/0236363 A1 * | 10/2006 | Heard | .................... | H04L 63/101 726/1 |
| 2007/0136089 A1 * | 6/2007 | Schneider | ............. | G06F 19/327 705/2 |
| 2008/0052532 A1 * | 2/2008 | Akkar | .................. | G06F 9/3004 713/189 |
| 2010/0064341 A1 * | 3/2010 | Aldera | .................. | H04L 63/102 726/1 |

(Continued)

*Primary Examiner* — Maung Lwin
(74) *Attorney, Agent, or Firm* — Ference & Associates LLC

(57) ABSTRACT

Methods and arrangements for protecting enterprise data with respect to a hybrid application in a mobile device that accesses a global computer information network using enterprise infrastructure. A hybrid application is recognized in a mobile device, the hybrid application being configured to communicate with an enterprise network and a non-enterprise network. There are provided, in communication with the hybrid application, controls for segregating data flows from the enterprise network and non-enterprise network. A policy service is provided, which applies a policy for the segregating and governed routing of data flows from the enterprise network and the non-enterprise network. Other variants and embodiments are broadly contemplated herein.

20 Claims, 4 Drawing Sheets

(56) References Cited

U.S. PATENT DOCUMENTS

| | | | |
|---|---|---|---|
| 2010/0106920 A1* | 4/2010 | Anckaert | G06F 21/79 711/154 |
| 2010/0146269 A1* | 6/2010 | Baskaran | G06F 21/10 713/165 |
| 2013/0086684 A1* | 4/2013 | Mohler | G06F 21/53 726/24 |
| 2013/0104190 A1* | 4/2013 | Simske | G06F 21/60 726/1 |
| 2013/0291055 A1* | 10/2013 | Muppidi | H04L 63/20 726/1 |
| 2014/0006772 A1* | 1/2014 | Qureshi | G06F 21/10 713/150 |
| 2014/0032758 A1* | 1/2014 | Barton | H04L 41/00 709/225 |
| 2014/0189781 A1* | 7/2014 | Manickam | H04L 67/34 726/1 |
| 2015/0235021 A1* | 8/2015 | Ordille | G06F 21/45 726/6 |

* cited by examiner

GOVERNED ROUTING OF ENTERPRISE DATA IN HYBRID MOBILE APPLICATIONS

BACKGROUND

As is generally known, a user often has access to enterprise and non-enterprise networks alike, via his or her personal device (such as a mobile phone, smartphone, laptop computer or tablet computer). For instance, he or she may have access to enterprise data via his or her workplace, and that same workplace may have something of a permissive BYOD ("bring your own device") policy.

As such, data entering the user's device from an enterprise or non-enterprise network could well be processed by enterprise or non-enterprise applications (or "apps"). This can expose a hybrid mobile enterprise application to vulnerabilities (e.g., from non-enterprise data) while a hybrid mobile non-enterprise application can be malicious in its own right, and thus compromise the enterprise network and/or any data originating therefrom. To date, conventional arrangements have largely not been adequately effective in preventing potential security breaches that may arise with a hybrid application.

BRIEF SUMMARY

In summary, one aspect of the invention provides a method of protecting enterprise data with respect to a hybrid application in a mobile device that accesses a global computer information network using enterprise infrastructure, said method comprising: utilizing at least one processor to execute computer code configured to perform the steps of: recognizing a hybrid application in a mobile device, the hybrid application being configured to communicate with an enterprise network and a non-enterprise network; providing, in communication with the hybrid application, controls for segregating data flows from the enterprise network and non-enterprise network; and providing a policy service which applies a policy for the segregating and governed routing of data flows from the enterprise network and the non-enterprise network.

Another aspect of the invention provides an apparatus for protecting enterprise data with respect to a hybrid application in a mobile device that accesses a global computer information network using enterprise infrastructure, said apparatus comprising: at least one processor; and a computer readable storage medium having computer readable program code embodied therewith and executable by at least one processor, the computer readable program code comprising: a computer readable storage medium having computer readable program code embodied therewith, the computer readable program code comprising: computer readable program code configured to recognize a hybrid application in a mobile device, the hybrid application being configured to communicate with an enterprise network and a non-enterprise network; computer readable program code configured to provide, in communication with the hybrid application, controls for segregating data flows from the enterprise network and non-enterprise network; and computer readable program code configured to provide a policy service which applies a policy for the segregating and governed routing of data flows from the enterprise network and the non-enterprise network.

An additional aspect of the invention provides a computer program product for protecting enterprise data with respect to a hybrid application in a mobile device that accesses a global computer information network using enterprise infrastructure, said computer program product comprising: a computer readable storage medium having computer readable program code embodied therewith, the computer readable program code comprising: computer readable program code configured to recognize a hybrid application in a mobile device, the hybrid application being configured to communicate with an enterprise network and a non-enterprise network; computer readable program code configured to provide, in communication with the hybrid application, controls for segregating data flows from the enterprise network and non-enterprise network; and computer readable program code configured to provide a policy service which applies a policy for the segregating and governed routing of data flows from the enterprise network and the non-enterprise network.

A further aspect of the invention provides a method comprising: recognizing a hybrid application in a mobile device, the hybrid application being configured to communicate with an enterprise network and a non-enterprise network; providing, in communication with the hybrid application, controls for segregating data flows from the enterprise network and non-enterprise network, the controls being provided in the mobile device runtime, and being configured to selectively permit the hybrid application to write data from a data flow to one or more data sinks; implementing the controls for segregating data flows in middleware, without modification to the hybrid application; providing, in communication with the hybrid application, controls for governed routing of data flows from the enterprise network; providing controls for segregating data flows within a server-side adapter corresponding to the hybrid application; and providing a policy service which applies a policy for the segregating and governed routing of data flows from the enterprise network and the non-enterprise network, the policy indicating at least one enterprise domain to be segregated from non-enterprise data flows within the hybrid application.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Figure 1:
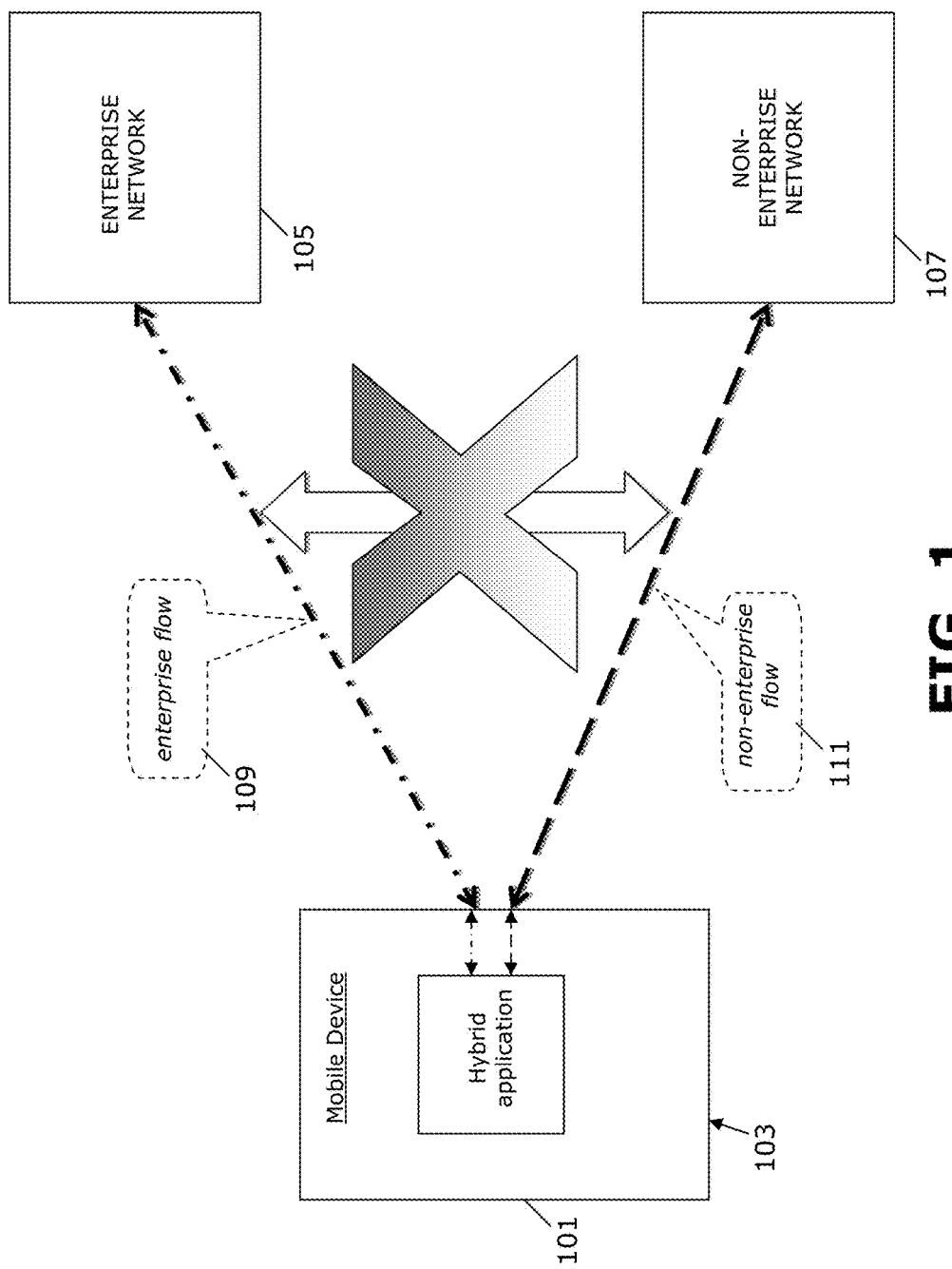
FIG. 1 schematically illustrates a general context in which hybrid applications may be exposed to different networks.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which secure enterprise data from third party or malicious hybrid mobile application in BYOD scenarios using information flow-based governed routing within JavaScript interpreters. This can involve building low overhead security controls that isolate individual information flows within applications executing both enterprise and non-enterprise data flows, and also can involve configuring security controls and enforcing policy on writes to data sinks on a per-data flow basis. Further, there is broadly contemplated herein a method for protection of security controls against malicious application through hardware and software memory protection mechanisms.

The features discussed above, and others, relating to at least one embodiment of the invention, will be better appreciated from the discussion which follows. As a matter of relevance to the discussion, Java® and various derivatives are registered trademarks of Oracle Corporation (Redwood City, Calif.) and its affiliates.

As generally understood herein, in accordance with at least one embodiment of the invention, an "enterprise" represents a distinct organization or group (e.g., a company, government agency or other pre-defined group) and an enterprise network can be understood to be a network belonging to (or associated with) an enterprise, storing and processing data that are not intended to be shared outside of the enterprise.

As generally understood herein, in accordance with at least one embodiment of the invention, a "hybrid application" represents an application hosted on a personal device that runs on the device and uses the device's browser engine to connect with the Web, e.g., to connect via HTTP while processing script locally. Thus, a hybrid application integrates and coordinates with the device's file system and Web-based services alike.

In accordance with at least one embodiment of the invention, it is recognized that enterprises can be vulnerable to data exposure, especially in a BYOD setting. For instance, employees often use personal mobile devices and third-party application to access enterprise data (e.g., data stored in an enterprise network). Conventional solutions such as application inspection, micro or application-level VPNs (virtual private networks) and application isolation have numerous shortcomings which still lead to, e.g., a failure to detect all malicious behavior, to prevent leakage of enterprise data outside of VPN session control and ineffectiveness against attacks despite a nominal application of application boundaries. FIG. 1 schematically illustrates a general context in which hybrid application (101) in a personal device (103) (e.g., a mobile device) may be exposed to different networks (e.g., enterprise network 105 and non-enterprise network 107), and this helps appreciate various challenges confronted herein; essentially, it is recognized that a segregation of enterprise and non-enterprise data flow (indicated at 109 and 111, respectively), especially from the viewpoint of a hybrid application 101, is desired and welcome.

In accordance with at least one embodiment of the invention, enterprise data flows (109) are isolated inside the application 101 executing on a personal device end-point (103) without modifying or certifying the application 101. In this connection, a focus is imparted on ensuring the confidentiality and integrity of enterprise data flowing into and out of application, rather than focusing on behavior of individual application themselves. Accordingly, confidentiality and integrity of data streams can be assured via isolating data streams. As such, data security controls can be placed in a trusted middleware layer to protect the controls from malicious application and to create a generic solution that obviates any need to modify any application (such as application 101).

In accordance with at least one embodiment of the invention, it is recognized that potential attacks may come in many forms. For instance, an application processing enterprise data may not be trustworthy; e.g., it may have been written by an attacker or could have been compromised by an attacker via exploiting one or more vulnerabilities. If middleware is assumed to be trustworthy, then potential attacks may be dealt with effectively if, e.g., hardware of the device end-point functions according to its stated specification, an OS kernel correctly enforces memory isolation using page-level protections and, where needed, a communication channel between the application and enterprise provides confidentiality, authentication, and replay protection (this can be achieved, e.g., via existing arrangements such as VPNs and microVPNs).

In accordance with at least one embodiment of the invention, security controls are added within the mobile application device runtime and enterprise server, and a policy service is added to the enterprise backend server to ensure governed routing of enterprise data flows inside mobile application. The controls can thereby be implemented in middleware, without requiring any modification to an application. An illustrative example of an associated architecture may be appreciated from FIG. 2. As such, the security controls enforce data isolation, and the policy service specifies an isolation policy which designates one or more domains within the mobile application that should be isolated. In this connection, governed routing can prevent leakage of enterprise data (e.g., corporate data) through several helpful steps. First, sensitive data flows can be appropriately labeled as they enter the application; by way of illustrative example, this can be done when downloading sensitive content from an enterprise URL. Further, individual data flows can be isolated within an application to prevent a malicious application from transferring corporate data to non-corporate data flows that are being simultaneously processed by it. Additionally, there can be control of data sinks to which the data items from a data flow may permissibly be routed (thus, forming at least a portion of the aforementioned "governed routing"), to prevent enterprise data from being transferred to unauthorized entities.

Figure 2:
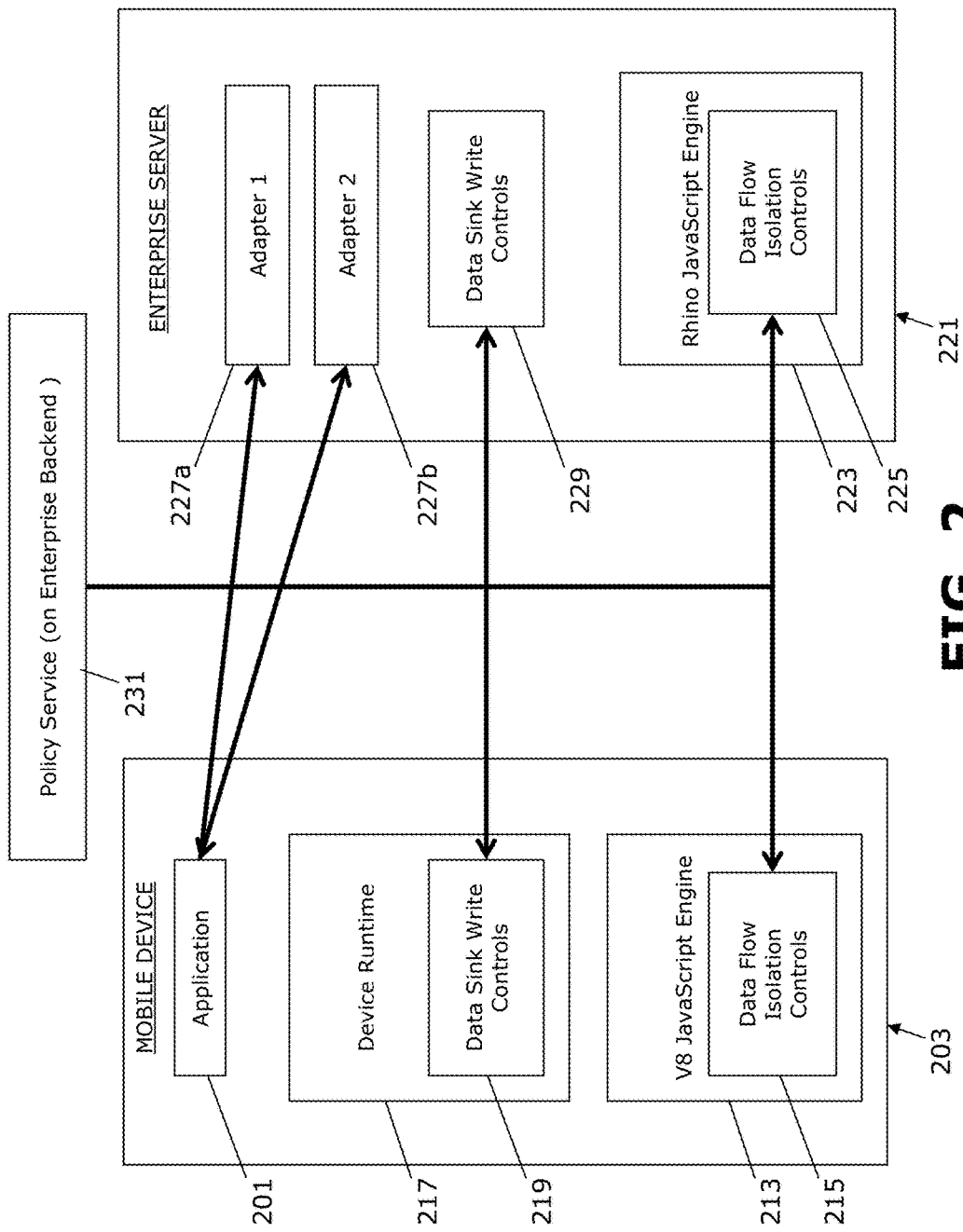
FIG. 2 schematically illustrates a general system architecture.

As such, in accordance with at least one embodiment of the invention, as can be appreciated from FIG. 2, a system architecture may include three main sets of components, on the client side, the server side, and with respect to a policy service. On the client side, e.g., within a JavaScript engine 213, there may be provided controls 215 for isolating individual data flows within the application 201 on the mobile device 203. For each data sink exposed by the device runtime API (217) to the application 201, there can also be controls 219 within the runtime that can allow or deny the application 201 (or one or more other applications) from writing data from a data flow to that data sink. On the side of enterprise server 221, there may be provided controls 225, e.g., within a JavaScript engine 223, for isolating individual data flows within each adapter executing in the server (two such adapters 227*a/b* are shown). For each data sink exposed by the server to an adapter 227*a/b*, there can be provided controls 229 that can allow or deny an adapter from writing data from a data flow to that data sink.

Additionally, in accordance with at least one embodiment of the invention, a policy service 231 may be provided, in a manner as shown, that can dynamically and automatically produce policies to configure the data sink controls (219, 229) in the device runtime 217 and the server 221 at the start of an enterprise data flow. Thus, for instance, for a given data flow originating from the enterprise, the policy can indicate those data sinks to which the data from that flow may be routed by the application 201 and its adapters 227*a/b*.

By way of an illustrative example, in accordance with at least one embodiment of the invention, the security controls (215, 225) for isolating individual data flows can be built with low performance overhead via recognizing data flows as a collection of stack+heap variables, modifying memory allocation mechanisms within JavaScript engines (213, 223) to co-locate the variables from each class for each data flow, and using hardware page-based memory protections or software-based protection techniques, such as pointer masking, to isolate the variables belonging to one data flow from another. To unambiguously identify data flows in whose context the application or its adapters are executing, memory protection mechanisms can be designed or provided such that an exception will be generated to a JavaScript engine (213, 223) when the application 201 or its adapters 227*a/b* switch between the variables belonging to different data flows. The corresponding JavaScript engine (213, 223) will identify the data flow to which the processing is switching based on memory protections.

In accordance with at least one embodiment of the invention, the internal state of a JavaScript interpreter is reinitialized when processing switches between data flows. This is done in recognition of the JavaScript interpreter being able to transfer information between data flows either implicitly or explicitly. As such, it may be necessary to reinitialize the internal state of the interpreter when processing switches between data flows, and this can be performed as part of handling the exception that signals the switch of processing between data flows.

By way of an illustrative example, in accordance with at least one embodiment of the invention, security controls (219, 229) for governing writes to data sinks can be built via setting per-data-sink permissions on a per-data-flow basis with low overhead. To this end, security controls can be embedded within each data-sink-access API call implementation to check if an application or an adapter is permitted to make that API call in the current context of the data flow. Further, a central repository of these permissions can be maintained within one or the other JavaScript Engine (213, 223), with all controls pointing to this repository to reduce configuration overhead. To unambiguously identify the data flow in whose context the application or its adapters are making an API call, there can be employed a mechanism for identifying the data flow in whose context execution is taking place as discussed hereabove.

In accordance with at least one embodiment of the invention, it is recognized that a malicious application can tamper with the security controls 219 placed within the device runtime 217. To protect the runtime integrity of security controls placed within the device runtime, hardware or software-based memory protections can be employed to prevent such tampering.

In view of the foregoing, it can be appreciated that various advantages may be enjoyed in accordance with at least one embodiment of the invention. For instance, embodiments of the invention provide fine-grained individual information-flow based isolation within application, as opposed to application/code level isolation. Further, end-to-end security is provided via isolation at both client and server runtimes. Middleware-based solutions are provided herein that do not necessitate application instrumentation and verification.

It can be appreciated from the foregoing that, in accordance with at least one embodiment of invention, a technical improvement is represented at least via provision of methods and arrangements which secure enterprise data from third party or malicious application in scenarios where enterprise data may be vulnerable, using information flow-based governed routing within script interpreters; this may involve building low overhead security controls that isolate individual information flows within applications executing both enterprise and non-enterprise data flows.

In accordance with at least one embodiment of the invention, very generally, quantitative values as determined herein, or other data or information as used or created herein, can be stored in memory or displayed to a user on a screen, as might fit the needs of one or more users.

Figure 3:
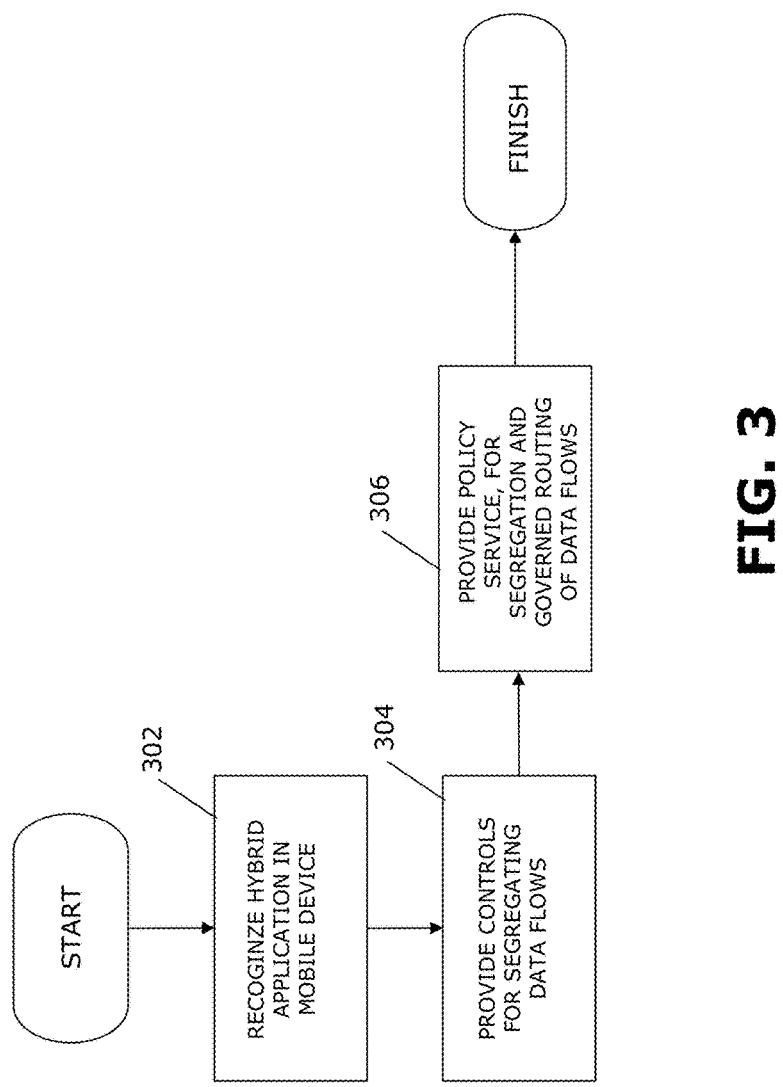
FIG. 3 sets forth a process more generally for protecting enterprise data with respect to a hybrid application in a mobile device that accesses a global computer information network using enterprise infrastructure.

FIG. 3 sets forth a process more generally for protecting enterprise data with respect to a hybrid application in a mobile device that accesses a global computer information network using enterprise infrastructure, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, a hybrid application is recognized in a mobile device, the hybrid application being configured to communicate with an enterprise network and a non-enterprise network (302). There are provided, in communication with the hybrid application, controls for segregating data flows from the enterprise network and non-enterprise network (304). A policy service is provided, which applies a policy for the segregating and governed routing of data flows from the enterprise network and the non-enterprise network (306).

Figure 4:
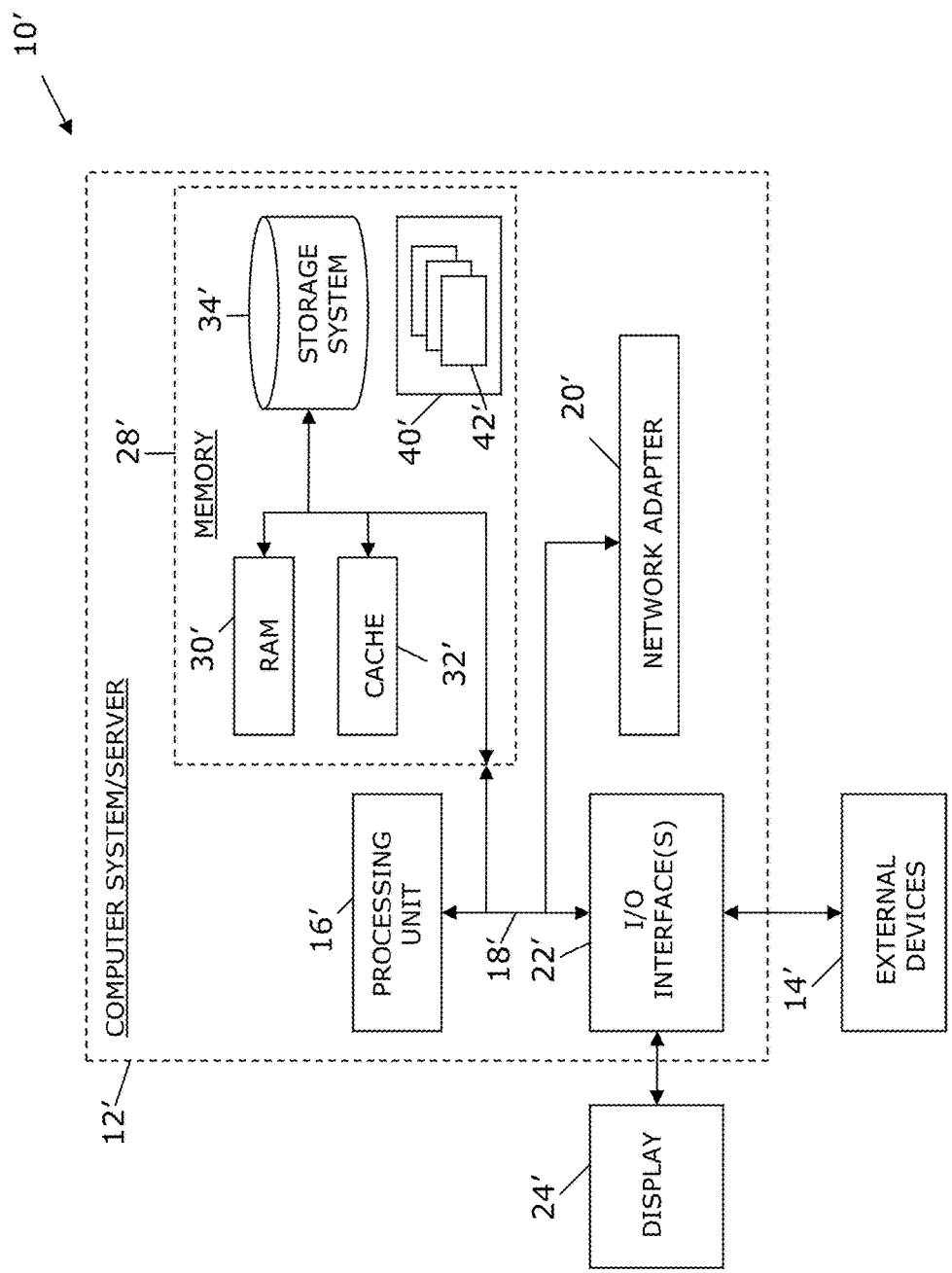
FIG. 4 illustrates a computer system.

Referring now to FIG. 4, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of protecting enterprise data with respect to a hybrid application in a mobile device that accesses a global computer information network using enterprise infrastructure, said method comprising:
utilizing at least one processor to execute computer code that performs the steps of:
detecting the hybrid application in the mobile device, the hybrid application being configured to communicate with an enterprise network and a non-enterprise network;
providing, in communication with the hybrid application, controls for segregating data flows from the enterprise network and non-enterprise network;
identifying, at least one data flow comprising enterprise content; and
providing a policy service which applies a policy for the segregating and governed routing of data flows from the enterprise network and the non-enterprise network to be carried out by the provided controls;
wherein the policy service in conjunction with the controls isolates the at least one data flow from other data flows by recognizing the data flows as a collection of stack+heap variables and isolating the variables belonging to the at least one data flow from the variables belonging to the remaining data flows; and
wherein the policy service in conjunction with the controls routes the at least one data flow to a predetermined data sink and wherein the controls identify permissions designating at least one application that has permission to access the predetermined data sink with the at least one data flow.

2. The method according to claim 1, wherein the policy indicates at least one enterprise domain to be segregated from non-enterprise data flows within the hybrid application.

3. The method according to claim 1, wherein:
the controls are provided in the mobile device runtime; and
the controls are configured to selectively permit the hybrid application to write data from a data flow to one or more data sinks.

4. The method according to claim 1, comprising providing controls for segregating data flows within a server-side adapter corresponding to the hybrid application.

5. The method according to claim 4, wherein the controls at the server-side adapter are configured to selectively permit the adapter to write data from a data flow to one or more data sinks.

6. The method according to claim 1, comprising configuring, via the policy service, data sink controls in at least one of: a runtime of the mobile device and an enterprise server.

7. The method according to claim 6, wherein said configuring comprises configuring the data sink controls at the start of an enterprise data flow.

8. The method according to claim 7, wherein the policy indicates one or more data sinks to which data from the enterprise data flow is permissibly be routed.

9. The method according to claim 1, comprising providing, in communication with the hybrid application, controls for governed routing of data flows from the enterprise network.

10. The method according to claim 9, wherein the policy indicates one or more data sinks to which data from the enterprise data flow is permissibly be routed.

11. The method according to claim 1, comprising implementing the controls in middleware, without modification to the hybrid application.

12. An apparatus for protecting enterprise data with respect to a hybrid application in a mobile device that accesses a global computer information network using enterprise infrastructure, said apparatus comprising:
at least one hardware processor; and
a computer readable storage medium having computer readable program code embodied therewith, executable by the at least one hardware processor, and comprising:
computer readable program code configured to detect the hybrid application in the mobile device, the hybrid application being configured to communicate with an enterprise network and a non-enterprise network;
computer readable program code configured to provide, in communication with the hybrid application, controls for segregating data flows from the enterprise network and non-enterprise network;
computer readable program code configured to identify, at least one data flow comprising enterprise content; and
computer readable program code configured to provide a policy service which applies a policy for the segregating and governed routing of data flows from the enterprise network and the non-enterprise network to be carried out by the provided controls;
wherein the policy service in conjunction with the controls isolates the at least one data flow from other data flows by recognizing the data flows as a collection of stack+heap variables and isolating the variables belonging to the at least one data flow from the variables belonging to the remaining data flows; an
wherein the policy service in conjunction with the controls routes the at least one data flow to a predetermined data sink and wherein the controls identify permissions designating at least one application that has permission to access the predetermined data sink with the at least one data flow.

13. A non-transitory computer program product for protecting enterprise data with respect to a hybrid application in a mobile device that accesses a global computer information network using enterprise infrastructure, said non-transitory computer program product comprising:
a computer readable storage medium having computer readable program code embodied therewith and comprising:
computer readable program code configured to detect the hybrid application in the mobiie device, the hybrid application being configured to communicate with an enterprise network and a non-enterprise network;
computer readable program code configured to provide, in communication with the hybrid application, controls for segregating data flows from the enterprise network and non-enterprise network;
computer readable program code configured to identify, at least one data flow comprising enterprise content; and
computer readable program code configured to provide a policy service which applies a policy for the segregating and governed routing of data flows from the enterprise network and the non-enterprise network to be carried out by the provided controls;
wherein the policy service in conjunction with the controls isolates the at least one data flow from other data flows by recognizing the data flows as a collection of stack+heap variables and isolating the variables belonging to the at least one data flow from the variables belonging to the remaining data flows; and wherein the policy service in conjunction with the controls routes the at least one data flow to a predetermined data sink and wherein the controls identify permissions designating at least one application that has permission to access the predetermined data sink with the at least one data flow.

14. The non-transitory computer program product according to claim 13, wherein the policy indicates at least one enterprise domain to be segregated from non-enterprise data flows within the hybrid application.

15. The non-transitory computer program product according to claim 13, wherein:

the controls are provided in the mobile device runtime; and the controls are configured to selectively permit the hybrid application to write data from a data flow to one or more data sinks.

16. The non-transitory computer program product according to claim 13, wherein said computer readable program code is configured to provide controls for segregating data flows within a server-side adapter corresponding to the hybrid application.

17. The non-transitory computer program product according to claim 13, wherein the policy service configures data sink controls in at least one of: a runtime of the mobile device and an enterprise server.

18. The non-transitory computer program product according to claim 13, wherein said computer readable program code is configured to provide, in communication with the hybrid application, controls for governed routing of data flows from the enterprise network.

19. The non-transitory computer program product according to claim 18, wherein the policy indicates one or more data sinks to which data from the enterprise data flow is permissibly be routed.

20. A method comprising:

detecting a hybrid application in a mobile device, the hybrid application being configured to communicate with an enterprise network and a non-enterprise network;

providing, in communication with the hybrid application, controls for segregating data flows from the enterprise network and non-enterprise network, the controls being provided in the mobile device runtime, and being configured to selectively permit the hybrid application to write data from a data flow to one or more data sinks;

implementing the controls for segregating data flows in middleware, without modification to the hybrid application;

providing, in communication with the hybrid application, controls for governed routing of data flows from the enterprise network;

providing controls for segregating data flows within a server-side adapter corresponding to the hybrid application; and providing a policy service which applies a policy for the segregating and governed routing of data flows from the enterprise network and the non-enterprise network to be carried out by the provided controls;

the policy indicating data flows from at least one enterprise domain to be segregated from non-enterprise data flows within the hybrid application from other data flows by recognizing the data flows as a collection of stack+heap variables and segregating the variables belonging to the at least one data flow from the variables belonging to the remaining data flows; and wherein the policy routes the data flows from the at least one enterprise domain to a predetermined data sink and wherein the controls identify permissions designating at least one application that has permission to access the predetermined data sink with the data flows from the at least one enterprise domain.

\* \* \* \* \*